GAD SMITH.

Improvement in Broom Heads.

No. 118,493.  Patented Aug. 29, 1871.

UNITED STATES PATENT OFFICE.

GAD SMITH, OF WOODSTOWN, NEW JERSEY, ASSIGNOR TO HIMSELF AND DICKINSON & BROS., OF SAME PLACE.

IMPROVEMENT IN BROOM-HEADS.

Specification forming part of Letters Patent No. 118,493, dated August 29, 1871.

*To all whom it may concern:*

Be it known that I, GAD SMITH, of Woodstown, county of Salem, State of New Jersey, have invented certain Improvements in Broom-Heads; and I hereby declare the following to be a full, clear, and accurate description of my invention, such as will enable others to make and use the same, reference being had to the accompanying drawing.

My invention consists of forming a broom-head, of malleable metal, of two parts or leaves so formed that they will close upon each other and form a continuous covering, and at the same time binding the corn thoroughly and securely at the jaws, and bringing the butts together compactly, thus securing firmness and solidity, and, when finally brought together on the broom-handle, securing the same to the broom firmly without the possibility of working loose; the said invention consisting of a new and improved method of effecting these results.

Figure 1:
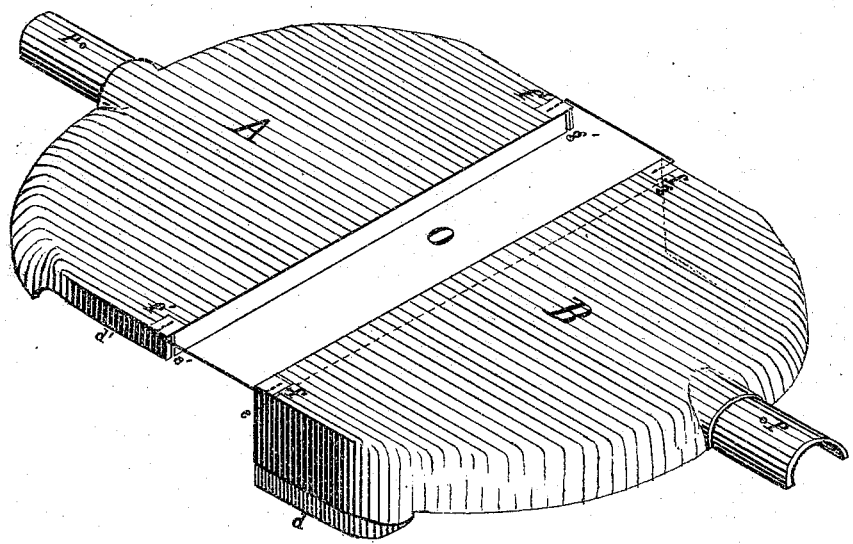

Figure 1 is an isometrical projection of the the broom-head, A representing one of the leaves and B the other, O being the opening into which the broom-corn is inserted when the head is in this position. When in this position the jaws are open the widest possible and the broom-corn is inserted. The ends P P are then brought together downward, the leaves A and B turning upon the wire hinges $f f f' f'$; the edges of the jaws $e g$ $e' g'$ are brought nearer together, and the broom-corn securely fastened between them. When the leaves are brought quite together the wire hinges will have the position indicated by $f'''$ in Fig. 2, bringing the strain directly in the direction of the fibers, the position best adapted to receive it. On the inside of each shank, at P P, is a sharp spud or spur about one-half an inch long, the handle being placed in position. These spuds are pressed into it until the shanks are flush their whole length (about two and one-half inches) with the handle, which is then securely fastened by driving the ferrule tightly upon the shanks. In Fig. 1 the sides of the leaves at $d$ and $d'$ are halved off upon opposite sides so that when brought together they will shut into each other, and while shutting together these edges act like shears (not to cut the corn, because it meets the edges at too great an angle from perpendicular) and push the ends together inside of the head, acting in that respect automatically. The ferrule is made a little smaller at one end than at the other, that it may more securely fasten the handle. The head is rounded off in two directions to effect the greatest stiffness and rigidity. The sides are given such a shape as most effectually to force the broom-corn into the inside of the head when shutting the leaves.

Figure 2:
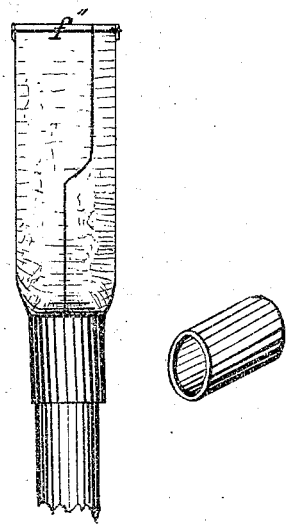

Fig. 2 is a side view of the head when closed upon a handle, with separate view of ferrule.

Having thus described my invention, I claim as new and desire to secure by Letters Patent of the United States of America—

In a broom-head, the combination of the leaves A and B, sides $d$ and $d'$, hinges $f f'$, and the ferrule-fastening, all constructed and operating as described.

The above specification of my invention signed by me this 20th day of July, 1871.

GAD SMITH.

Witnesses:
 EDM. F. BROWN,
 W. H. BRAINARD.